United States Patent [19]

Lyman

[11] 3,753,533

[45] Aug. 21, 1973

[54] TAPE REEL

[75] Inventor: George F. Lyman, Weston, Mass.

[73] Assignee: Data Packaging Corporation, Cambridge, Mass.

[22] Filed: Aug. 20, 1970

[21] Appl. No.: 65,513

[52] U.S. Cl. .......................... 242/55.19 A, 242/71.8

[51] Int. Cl. ......................... B65h 17/48, B21c 47/02

[58] Field of Search .............. 242/55.19 A, 55.19 R, 242/71.8, 71.8 A, 118.6, 118.61, 118.3, 118.8

[56] References Cited

UNITED STATES PATENTS

| | | | |
|---|---|---|---|
| 3,350,028 | 10/1967 | Lear | 242/71.8 |
| 3,215,362 | 11/1965 | Steinback | 242/118.8 |
| 2,476,928 | 7/1949 | Thomas | 242/71.8 |
| 3,361,381 | 1/1968 | Livingstone | 242/118.3 |
| 2,921,787 | 1/1960 | Cousino | 242/55.19 A |
| 3,552,677 | 1/1971 | Hacker | 242/118.61 |
| 2,951,654 | 9/1960 | Steelman | 242/55.19 A |
| 3,126,163 | 3/1964 | Knox | 242/55.19 A |

*Primary Examiner*—Billy S. Taylor
*Attorney*—Wolf, Greenfield and Sacks

[57] ABSTRACT

The disclosure includes an improved tape reel structure for use in a magnetic tape cartridge. The complete cartridge includes an endless tape which is wound about the tape reel and in which the magnetic tape is fed from the central portion of the tape reel and is rewound about the outer region of the reel in the usual manner. The tape reel includes two basic parts, a platform and a central cap which are connected by an improved mechanical interlock which secures the parts together and which precludes their relative rotation.

13 Claims, 5 Drawing Figures

INVENTOR
GEORGE F. LYMAN
BY
Wolf, Greenfield & Sacks
ATTORNEYS

INVENTORS
GEORGE F. LYMAN
BY
Wolf, Greenfield & Sacks
ATTORNEYS

TAPE REEL

BACKGROUND OF THE INVENTION

In the construction of tape reels for use in endless tape cartridges of the type described, the reels include a generally flat platform and a central, upstanding hub which support the tape in a coiled position on the platform and about the hub. In order to facilitate continuous withdrawal of the endless tape from the innermost coil, the periphery of the hub is undercut to define an annular slot about the hub. The requirement of the annular slot makes it difficult to mold the tape reels in a singular, unitary piece. Accordingly, one of the more common practices in fabricating the tape reels has been to mold the platform and hub in an integral piece and mold the cap in a separate piece. These parts then are connected together by a bonding technique which is both cumbersome and expensive.

The expense of fabricating tape reels by the foregoing bonding technique is exaggerated further by the fact that the cap must be fabricated from a material having low friction characteristics to permit the inner coil of the endless tape to slip freely past the cap. Thus, it has been common to employ materials such as Teflon, Delrin and the like. These materials, which are relatively expensive, are difficult to bond to other, dissimilar plastic materials. In order to facilitate bonding of these parts it has been necessary to fabricate the tape platform from the same expensive material as that used in the cap.

It is among the primary objects of the invention to provide a tape reel structure for use in an endless tape cartridge in which the tape platform and cap are secured together by a mechanical interlock which permits the tape platform to be fabricated from a relatively inexpensive material dissimilar from that of the cap.

SUMMARY OF THE INVENTION

In brief, the tape platform is vacuum molded in a single unitary piece from a relatively thin sheet of inexpensive plastic material such as styrene. The platform is molded with an integral central hub which tapers upwardly from the platform. The upper end of the hub includes an integral, inner peripheral margin which lies in a substantially horizontal plane. Integral with the inner edge of the inner peripheral margin is a downwardly and inwardly extending locking flange which terminates in a circular, free edge defining a hole at the center of the integral platform and hub.

The cap, which is formed from an appropriate low-friction material, includes a plurality of downwardly extending, circumferentially spaced prongs which, before assembly, are registerable with the flat annular surface at the top of the conical hub. When the cap and hub are so registered they are pressed together which causes the prongs to puncture the annular surface of the hub. The cap also includes a plurality of circumferentially spaced, downwardly projecting locking fingers which extend through the central hole in the hub and which snap below, in interlocking engagement with, the locking ring defining the central hole in the hub. These parts are dimensioned so that when the hub and cap are snapped together, the locking fingers will preclude axial separation of the hub and cap and the prongs will preclude relative rotation of the cap and hub.

A further aspect of the invention relates to the formation of a plurality of circumferentially spaced, inwardly projecting dimples formed at the underside of the platform. The dimples are intended to permit stacking of the reels at spaced intervals. The dimples on one reel engage the cap of another tape reel. This is important when tapes are wound initially on the tape reels. The tapes are wound simultaneously on a gang of reels and the dimples are effective to maintain the desired separation between the reels during the gang winding.

It is among the primary objects of the invention to provide an improved construction for a cartridge tape reel in which the cap and platform may be fabricated from dissimilar materials yet which may be secured to each other rigidly and inexpensively.

A further object of the invention is to provide a technique for connecting the tape platform and the cap in a tape reel used in an endless tape cartridge which includes purely mechanical means and which avoids the use of any chemical, thermal or ultrasonic bonding techniques.

A further object of the invention is to provide a tape reel of the type described with results and substantial manufacturing economies and simplified manufacturing techniques.

DESCRIPTION OF THE DRAWINGS

These and other objects and advantages of the invention will be understood more fully from the following detailed description thereof, with reference to the accompanying drawings wherein.

DESCRIPTION OF THE PREFERRED EMBODIMENT

Figure 1:
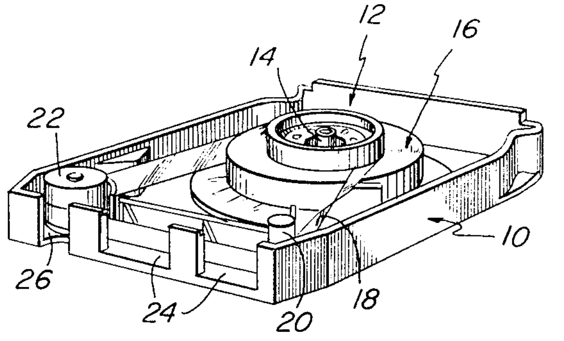
FIG. 1 is an illustration of a tape cartridge embodying the invention with the cover of a cartridge removed.

FIG. 1 shows a typical magnetic tape cartridge of the type described having a base and a cover (not shown) which together define the cartridge housing. A tape reel, indicated generally by the reference character 12, is rotatably supported within the base 10 about a central spindle 14 which extends upwardly from the bottom of the base 10.

An endless tape 16 is wound about the tape reel 12 in the usual manner in which a loop of the endless tape 16 is withdrawn continuously from the inner coil of the tape, and is returned to the outside of the endless tape 16 where it is rewound. The endless loop 18 is passed about a post 20 and a roller 22 which are positioned to guide the withdrawn loop past openings 24 in the sidewall of the base 10. The openings receive appropriate transducers or members such as magnetic tape heads, pads, etc. The tape cartridge may be driven by a drive roller in the playback device (not shown) which registers with a slot 26 formed in the face near the roller 20 to permit the drive roller to engage the roller 22 and advance the tape.

Figure 2:
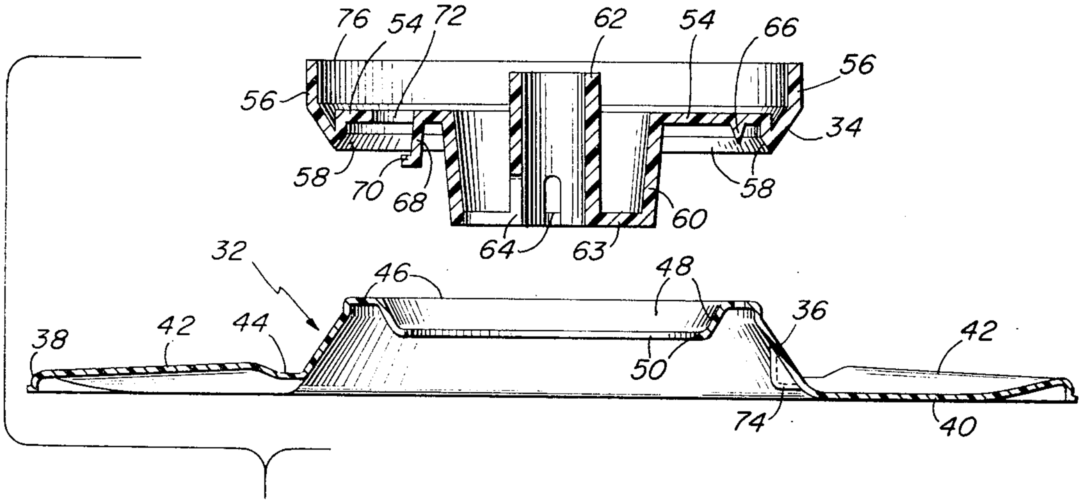
FIG. 2 is an exploded view of the two basic parts of the tape reel as seen in sections along the last 2—2 of FIG. 3.
Figure 3:
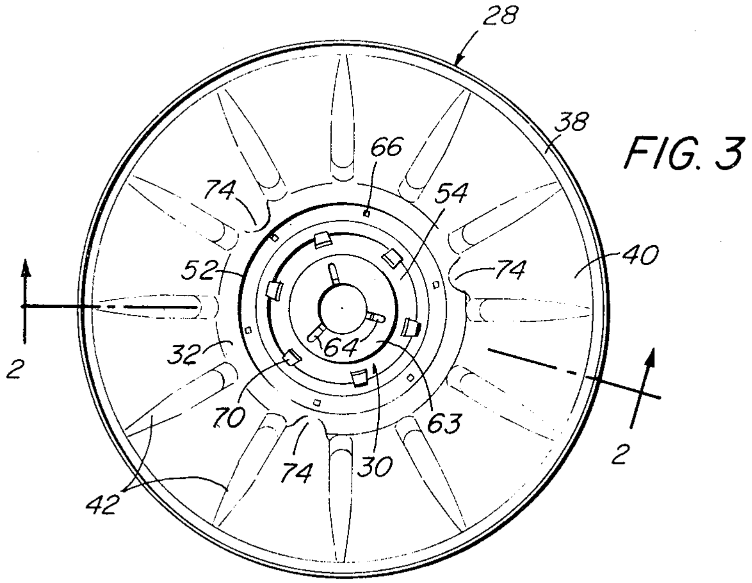
FIG. 3 is a planned view of the underside of the assembled parts of the tape reel.
Figure 4:
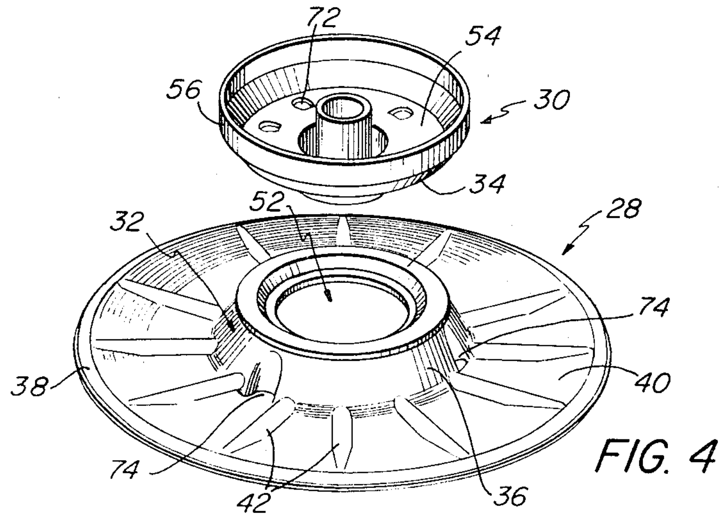
FIG. 4 is an exploded isometric view of the two basic parts of the tape reel before assembly.

As shown in FIGS. 2, 3, and 4 the tape reel itself is composed of two basic parts; namely, the tape platform 28 and the cap 30. The central portion of the tape platform 28 includes an integrally formed hub 32 which extends upwardly from the tape platform in a generally conical configuration. The cap 30, which is mated with the upper end of the conical hub 32, includes an inverted conical surface 34 which, when the parts are mated, cooperates with the conical surface 36 on the hub 32 to define an annular groove or recess extending circumferentially about the combined hub and cap. Additionally, the mating, conical surfaces 58, 36 are effective to insure that the cap is mated concentrically with the platform 28.

In endless cartridges of the type described, this recess has been found to be essential in order to permit the inner coil of the tape to be withdrawn freely from the tape reel 12. Additionally, it is particularly important that the portion of the cap 30 which defines the annular groove is formed from a relatively low-friction material. As mentioned above, the requirement for the annular groove with an upper surface formed from a low-friction material has resulted in the use of relatively expensive construction techniques and costly materials in order to attach effectively, the desired cap 30 to the tape platform 28.

In accordance with the invention, the tape platform 28 may be fabricated from a relatively thin sheet of high-impact styrene in a vacuum forming process. The cap 30 is formed from the desired low-friction material and is attached to the tape platform in the manner described below.

The tape platform is formed in a circular configuration having a downturned outer edge 38 and a central upwardly extending conical hub 32. The upper surface of the circular plate 40 defined between the hub 32 and outer edge 38 is formed with a number of radially extending ribs 42 which project above the surface of the circular plate 40 and which are inclined upwardly and inwardly from the peripheral edge 38 toward the hub 32. The inner ends of the ribs 32 merge smoothly with the conical surface 36 and the hub 32 and a slight depression 44 may be provided at this juncture. The upper end of the conical hub 32 is formed with an integral, flat annular ridge 46 and an inwardly, downwardly tapering lip 48 having an inner free edge 50 which defines a central hole 52 in the tape platform 28. As described below, the annular ridge 46 and annular lip 48 cooperate to receive the cap 30 in a rigid mechanical interlock.

The cap 30 is molded from a plastic material having the desired low-friction characteristics such as, for example, Delrin. The cap 30 is in the form of a shallow dish having a flat circular bottom wall and a peripheral wall surrounding the bottom wall 54. The peripheral wall 56 extends both above and below the level of the flat circular bottom wall 54 of the cap 30. The lower portion of the peripheral wall 56 is tapered in cross-section to define an inner conical surface 58 and the outer inverted conical surface 34. When the cap 30 and hub 32 are mated, the inner conical surface 58 mates with the conical surface 36 of the hub 32, the inverted conical 34 and conical surface 36 cooperate to define the annular groove about the combined cap and hub. The conical surfaces also register the cap 30 and hub 32 in concentric registry.

The central region of the cap 30 includes a downwardly extending boss 60 which is formed integrally with the flat circular bottom wall 54. The central portion of the boss 60 is formed into an integral, upstanding sleeve 62 which receives the central spindle 14 in the cartridge. The lower region of the boss 60 and sleeve 62 preferably are formed with a number of slots 64 which receive corresponding projections (not shown) formed on the central spindle to lock the tape reel to the spindle. When the cap 30 and tape platform 28 are connedted, the boss 60 extends downwardly through the central hole 52 in the platform 28 to an extent sufficient to engage the central spindle 14. The bottom surface 63 of the boss 60 is substantially flat except for the slots 64. This surface 63 serves as a low-friction bearing for the entire tape reel when the reel is mounted on the spindle within the cartridge housing.

The combined cap 30 and tape platform 28 are locked together to preclude axial separation and also to preclude relative rotation between the combined parts. Relative rotation is precluded by a plurality of downwardly projecting pins 66 which are formed integrally with the circular bottom wall 54 of the cap and which are spaced circumferentially about the bottom wall. The pins 66 are positioned about the underside of the bottom 54 and the cap 30 so that when the cap 30 and hub 32 of the tape platform 28 are combined, the pins 66 will be urged against the flat ridge 46 on the hub 32. The pins 66 are sharp enough to puncture the ridge 46 when the parts are brought together under a slight force. The pins 66 remain in their self-formed holes in the ridge 46 after assembly and are effective to preclude relative rotation of the assembled cap 30 and hub 32.

Axial separation of the tape platform 28 and cap 30 is precluded by a plurality of locking fingers 68 which are formed integrally with the bottom wall 54 of the cap and extend downwardly from the bottom wall 54. The locking fingers 68 are circumferentially spaced about the center of the cap 30 and may extend in a slight outward direction. The lower ends of the locking fingers 68 include radially and outwardly extending tips 70. The locking fingers 68 and their tips 70 are positioned circumferentially so that the outward ends of the tips 70 define a diameter which is slightly larger than the diameter of the central hole 52 formed in the hub 32. When the cap 30 and hub 32 of the tape platform 28 are brought together, the tips 70 of the locking fingers 68 snap past the inner, free edge 50 of the hub 32 so that after assembly, the tips 70 of the locking fingers 68 are disposed below and engage the underside of the annular lip 48, thus precluding subsequent axial separation of the cap 30 and tape platform 38. The various integral locking parts of the cap 30 and hub 32 are dimensioned so that after assembly, the annular lip 48 will retain the locking fingers 68 and, therefor, the cap, firmly against the hub 32 of the tape platform 28.

Figure 5:
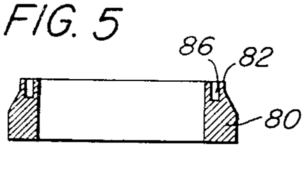
FIG. 5 is an illustration of a jig which may be used to assemble the cap and platform.

Assembly of the cap 30 and platform 28 may be facilitated by a jig as shown in FIG. 5 on which the platform is placed. The jig consists essentially of a ring 80 having an upper annular surface 82 which is intended to fit snugly at the underside of the tape platform 28 beneath the ridge 46. An annular groove 86 is formed at the upper surface 84 to permit the pins 66 to pass downwardly through and below the ridge 46. The upper surface of the ring 80 provides firm support for the ridge 46 during assembly.

With the foregoing construction of the cap 30 and tape platform, the parts may be assembled simply, quickly and inexpensively. In particular, the design of the parts providing the foregoing mechanical interlock permits the tape platform to be fabricated from relatively inexpensive material and in an inexpensive vacuum forming technique. The parts are assembled simply without the requirement heat sealing, ultrasonic or other adhesive or bonding techniques.

If, for any reason, it is desired to separate the cap 30 and tape platform 28, the invention includes an arrangement by which such separation is facilitated. For this purpose, the cap 30 includes a hole 72 formed in the bottom wall 54 in association with each of the locking fingers 68. Each of the holes 72 is disposed just radially outwardly above its associated locking fingers 68. When the cap 30 and hub 32 are assembled, the ridge 46 and annular lip formed at the top of the hub 32 are exposed through the holes 72. A slender object such as a pencil tip may be inserted downwardly through the hole 72 to force the inner, free edge 50 of the annular lip 48 out of locking engagement with its associated locking fingers 68. This will free the cap 30 from the tape platform 28.

A further aspect of the invention relates to the formation of a plurality of dimples 74 which are formed in the tape platform and which are circumferentially spaced about the region where the plate 40 and conical hub 36 meet. The dimples 74 are employed when a number of tape reels are stacked, coaxially, one against the other, as when gang winding a plurality of tapes onto a plurality of tape reels. The dimples 74 project inwardly and at the lower surface of the tape platform so that they may engage the upper surface 76 of the cap 30 on the next lower tape reel. The dimples 74 are dimensioned so that they will maintain the desired separation between the stacked reels to permit each of the tapes to be wound properly onto their associated tape reels.

It should be understood that the foregoing description of the invention is intended merely to be illustrative thereof and that other embodiments and modifications will be apparent to those skilled in the art without departing from its spirit.

Having thus described the invention, what is claimed is:

1. A tape reel for use in an endless tape cartridge comprising:
- a tape platform having a central upstanding hub;
- a cap on top of said hub and having an outer diameter greater than the diameter of the upper end of said hub;
- a plurality of pins secured to said cap and projecting downwardly therefrom through holes in said hub to preclude relative rotation of said cap and said platform;
- said hub having a hole formed centrally therein, said hole being defined by a resilient lip; and
- locking means secured to said cap and extending downwardly therefrom through said hole in said hub and into engagement with said lip to preclude axial separation of said cap and said platform.

2. A tape reel as defined in claim 1 further comprising:
- said cap having a bottom wall and a connector formed integrally with and projecting downwardly from said bottom wall through said central hole, said connector being adapted to support said tape reel for rotation about an axis passing therethrough, said pins and said locking means being formed integrally with said bottom wall of said cap.

3. A tape reel as defined in claim 2 wherein said cap is formed from a low-friction material and wherein said tape platform is formed from a dissimilar material.

4. A tape reel as defined in claim 2 wherein said pins are circumferentially spaced about said bottom wall and wherein said hub comprises:
- an annular ridge defining the top of said hub, said ridge being engageable with and puncturable by said pins.

5. A tape reel as defined in claim 2 wherein said locking means comprises:
- said bottom wall of said cap having integrally formed, downwardly extending finger means, said finger means terminating in an outwardly extending tip, said finger means passing through said central hole in said hub with said tip of said finger means being disposed below the lip in said hub defining said central hole.

6. A tape reel as defined in claim 5 wherein said finger means comprises:
- a plurality of separate, circumferentially spaced fingers engageable with said lip at different, circumferentially spaced locations about said hole.

7. A tape reel as defined in claim 6 wherein the upper end of said hub defines a ridge, said lip being formed integrally with said ridge and extending inwardly and downwardly from said ridge,
- said locking fingers and tips thereof extending downwardly from said bottom wall of said cap to an extent such that when said bottom wall of said cap rests on the ridge of said hub, said lip will bear resiliently and downwardly against said tip of each of said fingers.

8. A tape reel as defined in claim 6 further comprising:
- said bottom wall including a hole formed therein in association with each of said fingers, each of said holes being disposed radially outwardly of said fingers and above said tips of said fingers whereby the region of said lip engaged by said fingers is exposed through said hole.

9. A tape reel as defined in claim 2 further comprising:
- said pins being relatively sharp and being spaced circumferentially along the underside of said cap;
- the upper end of said hub defining an annular ridge registrable with said circumferentially spaced pins on said cap, said annular ridge being puncturable by said pins when said hub and cap are mated;
- said resilient lip being formed integrally with said ridge and extending downwardly and inwardly from said ridge;
- said locking means including a plurality of circumferentially spaced fingers formed integrally with the bottom wall of said cap and extending downwardly therefrom, each of said fingers terminating in an outwardly extending tip, each of said fingers passing through the central hole defined by said lip with the tip of each of said fingers being disposed below and in engagement with said lip.

10. A tape reel as defined in claim 9 wherein said locking fingers and associated holes are in circumferential alignment with each other and are circumferentially staggered with respect to said pins.

11. A tape reel as defined in claim 2 wherein said connector comprises:

a downwardly projecting boss formed integrally with said bottom wall of said cup and extending downwardly therefrom; and a sleeve formed integrally with and centrally within said boss, said sleeve being receptive to a spindle within said cartridge housing.

12. A tape reel as defined in claim 11 further comprising:

said boss having an undersurface adapted to serve as a bearing for said tape reel, said cap and boss being formed from a low-friction material.

13. A tape reel as defined in claim 2 wherein the outer surface of said hub is of generally conical configuration;

and wherein the cap includes a circumferential wall having a portion thereof extending downwardly below the bottom wall of said cap, the internal surface of said circumferential wall being of conical contour complementary to that of the hub whereby when said cap and hub are mated, said cap and hub will be aligned concentrically by reason of engagement of said conical surfaces of said cap and said hub.

* * * * *